(12) United States Patent
Hashimoto

(10) Patent No.: US 6,338,020 B2
(45) Date of Patent: *Jan. 8, 2002

(54) VEHICLE INFORMATION ACQUISITION SYSTEM INCLUDING CAPABILITY TO OBTAIN INFORMATION IN BLIND SPOTS

(75) Inventor: Takahiro Hashimoto, Susono (JP)

(73) Assignee: Toyota Jidosha Kabushiki Kaisha, Aichi-ken (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/195,917

(22) Filed: Nov. 19, 1998

(30) Foreign Application Priority Data

Nov. 20, 1997 (JP) ............................... 9-319498

(51) Int. Cl.$^7$ .......................... G01L 21/00; G06G 7/78; H04B 7/185
(52) U.S. Cl. .................. 701/208; 701/213; 701/117; 342/357.01; 342/357.1; 342/357.13; 342/357.17; 340/988; 340/995; 455/556; 455/456; 455/421
(58) Field of Search ................................ 701/208, 213, 701/214, 215, 216, 217, 117; 342/357.09, 357.1, 357.13, 357.14, 357.17; 340/988, 989, 990, 991, 993, 995; 455/556, 456, 33.1, 421, 432, 418, 419, 420

(56) References Cited

U.S. PATENT DOCUMENTS

| | | | | |
|---|---|---|---|---|
| 4,907,159 A | * | 3/1990 | Mauge et al. ............. 701/117 |
| 4,949,268 A | * | 8/1990 | Nishikawa et al. ......... 701/216 |
| 5,155,689 A | * | 10/1992 | Wortham ................. 455/456 |
| 5,396,647 A | * | 3/1995 | Thompson et al. ......... 455/33.2 |
| 5,442,805 A | * | 8/1995 | Sagers et al. ............. 455/33.1 |
| 5,579,535 A | * | 11/1996 | Orlen et al. ............. 455/33.1 |
| 5,627,549 A | * | 5/1997 | Park ..................... 342/357 |
| 5,731,978 A | * | 3/1998 | Tamia et al. ............. 701/201 |
| 5,806,018 A | * | 9/1998 | Smith et al. ............. 701/211 |
| 5,864,305 A | * | 1/1999 | Rosenquist ............... 340/905 |
| 5,959,577 A | * | 9/1999 | Fan et al. .............. 342/357.13 |
| 6,014,090 A | * | 1/2000 | Rosen et al. ............. 340/905 |
| 6,055,426 A | * | 4/2000 | Beasley .................. 455/432 |
| 6,108,533 A | * | 8/2000 | Brohoff .................. 455/414 |

FOREIGN PATENT DOCUMENTS

| | | |
|---|---|---|
| EP | 0 317 181 | 5/1989 |
| JP | 03-203770 | 9/1991 |
| JP | 7-262493 | 10/1995 |

OTHER PUBLICATIONS

PCT Notification dated Feb. 19, 1999.

* cited by examiner

Primary Examiner—Jacques H. Louis-Jacques
Assistant Examiner—Brian J Broadhead
(74) Attorney, Agent, or Firm—Finnegan, Henderson, Farabow, Garrett & Dunner, L.L.P.

(57) ABSTRACT

A system for acquiring map information reliably even when a vehicle is running in a blind area where the map information is not acquirable in real time, assisting the vehicle to keep running smoothly. In this system, necessary map information can be acquired from an external information center upon request via a communication device. Specifying data of a blind area in which the map information is not acquirable in real time is previously stored in a memory. Based on the specifying data stored in the memory and a current position of the vehicle detected as by GPS, a processor acquires the map information of the blind area from the information center upon request when the vehicle approaches the blind area. The acquired map information is stored in the memory and is read out for use in navigation.

13 Claims, 5 Drawing Sheets

VEHICLE INFORMATION ACQUISITION SYSTEM INCLUDING CAPABILITY TO OBTAIN INFORMATION IN BLIND SPOTS

BACKGROUND OF THE INVENTION

1. Field of the Invention

The present invention relates to an information acquisition system, and more particularly to an information acquisition system for acquiring necessary map data from an external information center outside a vehicle.

2. Description of the Related Art

A technique for acquiring map data, which is to be used in navigation of a vehicle, from an external information center is currently known.

This prior art is exemplified by Japanese Patent Laid-Open Publication No. Hei. 7-262493, which discloses a system for distributing, through communication media between a vehicle and an external information center, map information commensurate with the degree of detail needed in smooth running of the vehicle. Namely, the user requests distribution of detailed map information from the information center as required, or the system automatically requests detailed map information from the information center when the vehicle comes leaves the area of the present detailed map information. Thus the system receives the new map information newly distributed from the information center.

However, if the vehicle runs into a blind area in which detailed map information is not acquirable via any communication media, then the vehicle cannot keep running smoothly without consulting with the detailed map of the blind area.

SUMMARY OF THE INVENTION

It is an object of the present invention to provide an information acquisition system for acquiring map information of a blind area, where the map information is not acquirable from an external information center, without fail, even when the vehicle runs in the blind area, thus enabling the vehicle to keep running smoothly.

According to a first aspect of the invention, the above object is accomplished by an information acquisition system for acquiring map information from an external source outside a vehicle, comprising: storage means for storing specifying data of a blind area in which the map information is not acquirable; and control means for acquiring, based on the specifying data, the map information of the blind area when the vehicle approaches the blind area. The map information includes, in addition to the map data, data concerning various kinds of facilities (e.g. gas stations and restaurants). The blind area is an area within which the vehicle cannot receive the map information from the information center even if it requests the information center to supply such information. Before entering the blind area, the vehicle can acquire the map information of the blind area to keep running smoothly even in the blind area.

Preferably, the control means acquires the map information within a predetermined range from the current position of the vehicle. This predetermined range 4s preferably composed of a plurality of distance steps for each of which the control means acquires a different level of the map information. After the vehicle has passed the blind area, the map information of the blind area is no longer necessary, so it is preferable to delete the map information of the blind area.

According to a second aspect of the invention, the above object is accomplished by an information acquisition system for acquiring map information from an external information center outside a vehicle, comprising: a memory for storing specifying data of a blind area in which the map information is not acquirable; a processor for acquiring, based on the specifying data, the map information of the blind area when the vehicle approaches the blind area; and a communication device for requesting, based on a signal from the processor, the external information center for the map information and for receiving the map information transmitted from the information center.

Preferably, the memory has a first area for storing the specifying data, a second area for storing data of a map-information-acquirable area in which the map information is acquirable from the external information center, and a third area for storing the acquired map information. The processor acquires the map information of different levels commensurate with a distance from the current position of the vehicle to the blind area. If a blind area exists in a guide route from the current position of the vehicle to a destination, the processor acquires the map information of different levels commensurate with the distance from the current position of the vehicle to the blind area.

DETAILED DESCRIPTION OF THE PREFERRED EMBODIMENTS

Principles of the present invention are particularly useful when applied to an information acquisition system for a vehicle, preferred embodiments of which will now be described in detail with reference to the accompanying drawings.

First Embodiment

Figure 1:
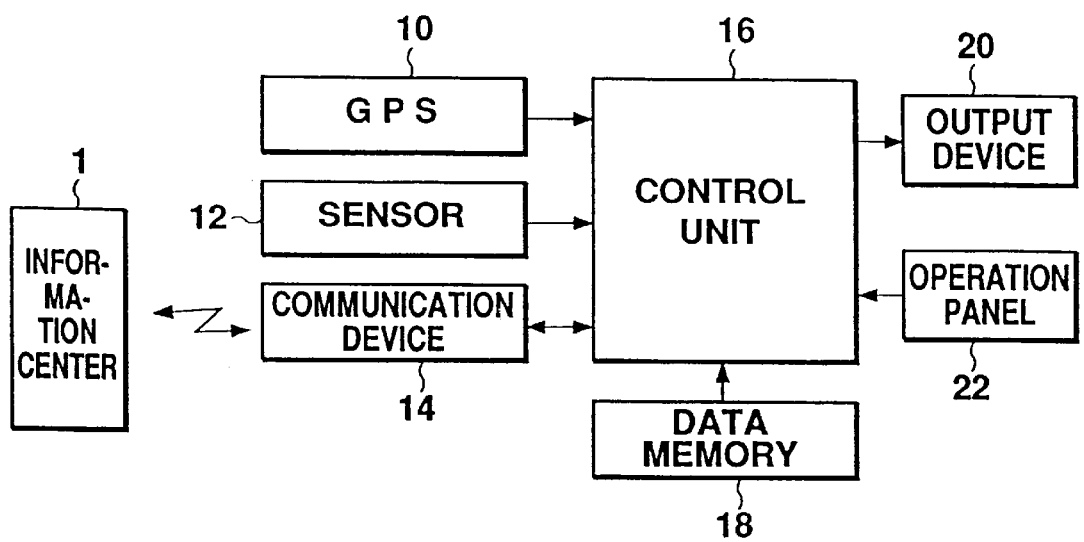
FIG. 1 is a block diagram showing an information acquisition system according to a first embodiment of the present invention.

FIG. 1 is a block diagram showing an information acquisition system according to a first embodiment of the present invention. The information acquisition system comprises a global positioning system (GPS) 10, a sensor 12, a communication device 14, a control unit 16, and a data memory 18, and an output device 20.

GPS 10 detects the position of a vehicle based on the reception of position signals from an array of orbiting satellites, and the output of the GPS 10 is supplied to the control unit 16.

The sensor 12 is a speed and/or direction sensor, or a fuel sensor, which supplies detection signals to the control unit 16. The detected direction and speed data, along with GPS signals, are used in detecting the position of the vehicle. Namely, the position of the vehicle is detected with high precision based on the position data obtained from the GPS signals and the position obtained from the detected direction and speed data.

The communication device 14 is a light or electromagnetic-wave communication device or a mobile telephone for requesting map information necessary for the vehicle from an external information center 1, receiving the map information transmitted from the information center 1 and supplying the received map information to the control unit 16.

The control unit 16 is a micro computer for determining a timing at which to request necessary map information from the information center 1 via the communication device 14, inputting the map information supplied from the communication device 14 and storing the input map information in the data memory 18. The control unit 16 executes a known navigational and surveying function using the map data stored in the data memory 18 and outputs on the output device 20 by displaying the map data read from the data memory 18 and the detected position of the vehicle in superimposition, or by surveying a guide route to a destination inputted via an operation panel 22 and displaying the surveyed guide route on the map data in superimposition.

The data memory 18 stores the map data obtained by the control unit 16, has specifying data of a blind area, in which map information is not acquirable from the information center 1, already stored, and supplies this specifying data to the control unit 16. The specifying data is to be used, along with the detected position of the vehicle, in determination of the timing to request the information center 1 for map information, and will be described below more in detail. The data memory 18 is a reloadable storage medium such as a magnetic disc, a semiconductor memory or an optical disc.

Figure 2:
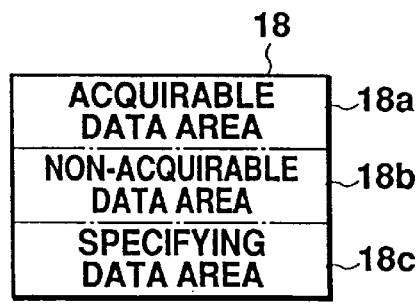
FIG. 2 is a diagram showing the structure of a data memory of the system of the first embodiment.

FIG. 2 schematically shows a structure of the data memory 18. The data memory 18 has an acquirable data area 18a, a non-acquirable data area 18b, and a specifying data area 18c.

In the acquirable data area 18a, map information, such as map data and facility data, of a map-information-acquirable area or region is to be stored as acquired from the information center 1 at every request.

In the non-acquirable data area 18b, map data of a map-information-non-acquirable or blind region or area where electric waves from the information center 1 cannot reach the vehicle is to be stored as acquired from the information center 1 at request before the vehicle enters the blind area. The empty capacity of the non-acquirable data area 18b serves as a factor determining which quantity of map information is previously acquirable.

In the specifying data area 18c, specifying data specifying the blind area is to be previously stored. The specifying data is exemplified by center-position data and radius data as defined in terms of the range of latitude and longitude. The control unit 16 reads the specifying data from the specifying data area 18c for use in determining the timing at which the map information of the blind area is to be requested to the information center 1.

The operation of the control unit 16 will now be described.

Figure 3:
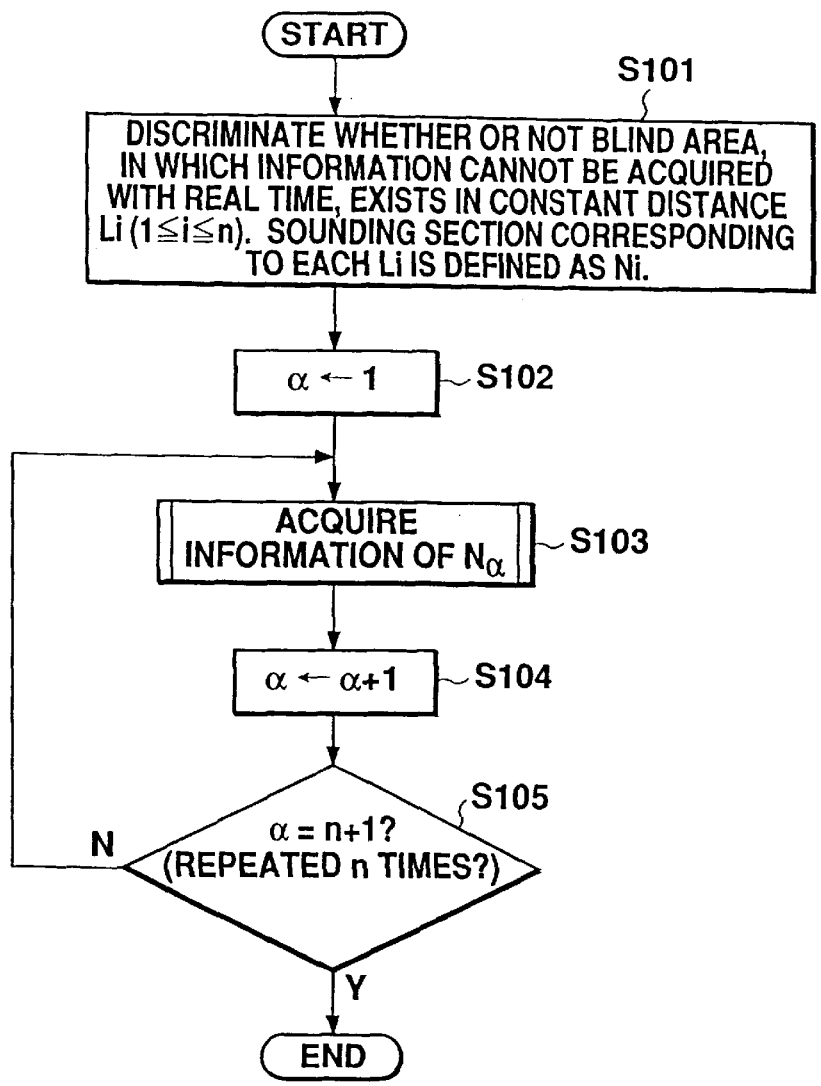
FIG. 3 is a flowchart showing a first example of sequential steps of operation of the system of the first embodiment.

FIG. 3 is a flowchart showing sequential steps to be executed by the control unit 16. Firstly, the control unit 16 confirms whether or not a blind area, in which map information such as map data and facility data cannot be acquired in real time, exists within a constant distance from a current position C of the vehicle (S101). This step is accomplished by comparing the detected current position C of the vehicle with a predetermined distance (e.g. 100 km) and the specifying data stored in data memory 18. The predetermined distance may be set as either a single distance step or a plurality of distance steps.

If the predetermined distance is set as a plurality of distance steps, the control unit 16 defines the predetermined distance as $L_i$ ($1 \leq i \leq n$, $L_1 < L_2 < L_2$) and the blind area corresponding to $L_i$ as $N_i$. The control unit 16 then initializes a variable $\alpha$ to 1 (S102) and increments the variable $\alpha$, by increments of 1 to obtain information of successive blind areas $N\alpha$ in order (S103, S104, S105).

Figure 4:
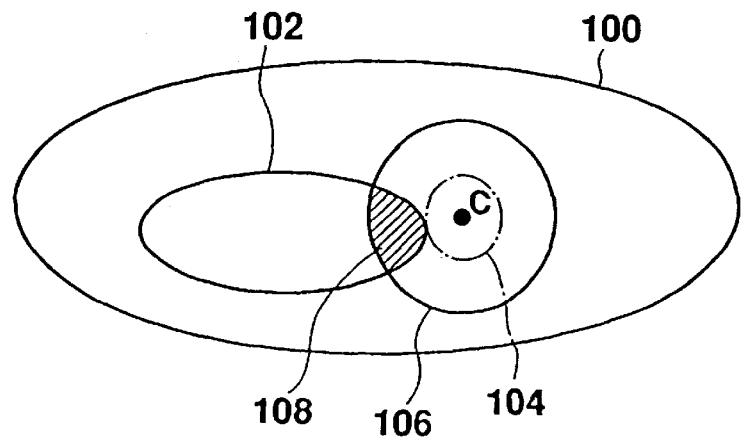
FIG. 4 is a diagram to be used in showing the first example.

FIG. 4 schematically shows the manner in which the map information is acquired in step S103. In FIG. 4, it is assumed that a map-information-acquirable area 100, in which map information can be acquired in real time with respect to the current position C of the vehicle exists, and a blind area 102, in which the map information cannot be acquired with real time with respect to the current position C of the vehicle, also exists. Generally, when the vehicle is located at the current position C, a request is transmitted to the information center 1 to acquire the map information (i.e. map data and facility data) of a region 104 indicated by a dash-and-dot line. If the blind area 102 exists within a predetermined distance (a region 106 covering, for example, 100 km from the current position C of the vehicle), the map information of the blind area 102 would be not acquirable in real time after it has entered the blind area 102. Consequently, when the vehicle approaches the blind area 102, namely, when the current position C of the vehicle is located within the map-information-acquirable area 100, a request is transmitted to the information center 1 to previously acquire the map information of a partial blind area 108 (i.e. $N\alpha$) located within the region 106 from the predetermined distance with respect to the current position C of the vehicle. Even when it has entered the blind area 108, the vehicle can keep running smoothly by using the information stored in the data memory 18.

If the predetermined distance is set as a plurality of distance steps, it is also desirable to acquire the map information of different levels one for every step of a predetermined distance instead of acquiring the same level of information for every $N\alpha$.

Figure 5:
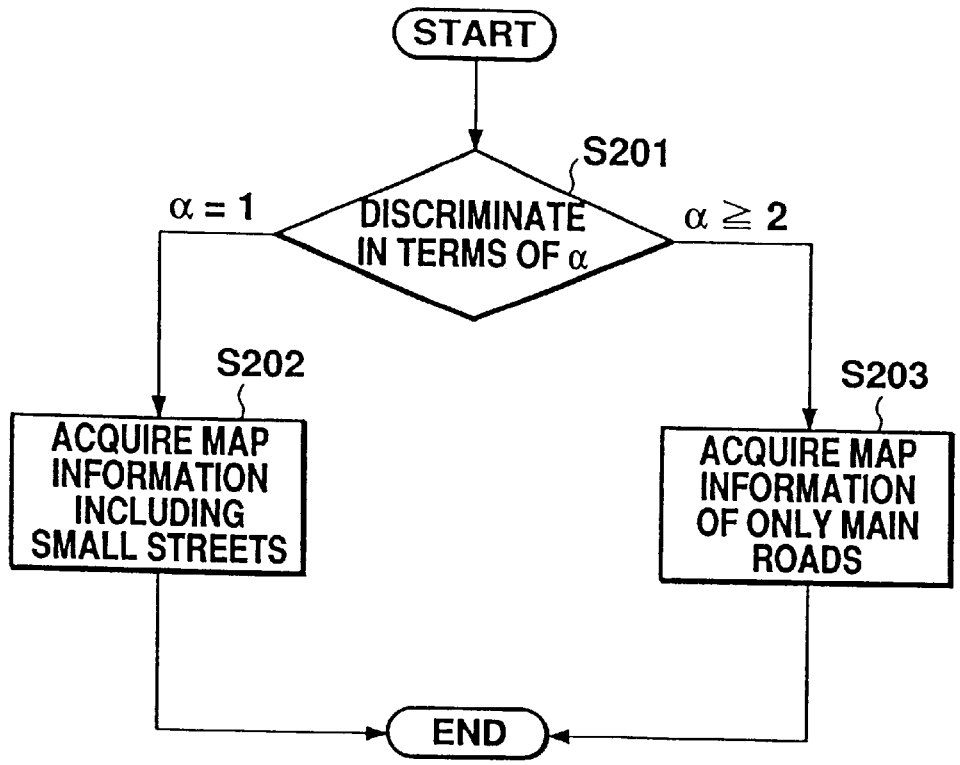
FIG. 5 is a flowchart showing a second example of sequential steps of operation of the system of the first embodiment.

FIG. 5 is a flowchart showing sequential steps in which map information of different levels is acquired one for each step of a predetermined distance. Firstly, discrimination is made as to whether or not $\alpha$ is 1 (S201), and if $\alpha$ is 1, namely, with respect to the blind area nearest to the current position C of the vehicle, detailed map information including small streets is acquired (S202). If $\alpha$ is 2 or more, map information of only main roads is acquired as the blind area is relatively far from the current position C of the vehicle (S203).

Figure 6:
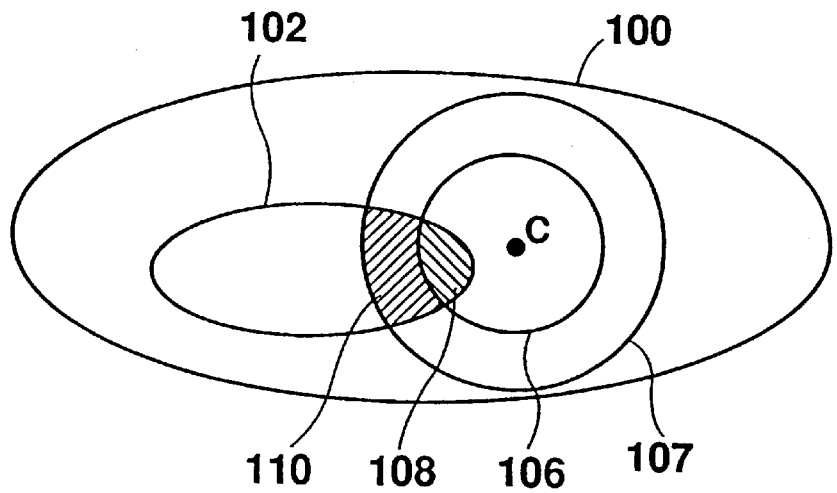
FIG. 6 is a diagram to be used in showing the second example.

FIG. 6 schematically show the manner in which the map information is acquired in steps S202, S203. Two predetermined distance steps are set from the current position C of the vehicle in such a manner that the first step corresponds to a first region 106 (e.g. 100 km away from the vehicle) and the second step corresponds to a second region 107 (e.g. 200 km away from the vehicle). With respect to a blind area 108 (i.e. N1) located within the first step, a request is transmitted to the information center to acquire detailed map information including small streets. With respect to a blind area 110 (i.e. N2) located within the second step, a request is transmitted to the information center to acquire map information of only main roads. The acquired information is then stored in the map-information-non-acquirable data area 18b of the data memory 18.

Thus since different levels of the map information vary stepwise according to the predetermined distance steps (according to the distance from the current position C of the vehicle) in such a manner that the farther the distance from the vehicle, the simpler the map information level, it is possible to use the map-information-acquirable data area 18b of the data memory 18 efficiently.

Thus, since different levels of the map information vary stepwise according to the predetermined distance steps (according to the distance from the current position C of the vehicle) in such a manner that the farther the distance from the vehicle, the simpler the map information level, it is possible to use the map-information-non-acquirable data area 18b of the data memory 18 efficiently.

If the predetermined distance of the blind area is set to two or more distance steps Na and if there is sufficient capacity of the map-information-non-acquirable data area 18b of the data memory 18, detailed map information including small streets is acquired for every Nα. Only if there is no room in the map-information-non-acquirable data area 18b, it is also desirable to acquire different levels of map information for each step of the predetermined distance.

In this embodiment, the distance from the current position of the vehicle may be varied commensurate with the vehicle speed detected by the sensor 12, instead of being fixed. Specifically, the higher the speed of the vehicle, the larger the predetermined distance may be increased. Of course, the unused capacity of the map-information-non-acquirable data area 18b of the data memory 1 may be checked and the predetermined distance may be set according to the unused capacity.

Also in this embodiment, facility data may be acquired as map information. Specifically, when a blind area exists in a guide route and when the remaining amount of fuel as calculated by the sensor 12 is expected near this blind area, the information of gas stations existing in the blind area is previously requested and acquired from the information center.

Further in this embodiment, when the vehicle has passed through the blind area whose map information was previously acquired from the information center, it is desirable to delete the map information stored in the map-information-non-acquirable data area 18b of the data memory 18, securing adequate memory capacity.

Second Embodiment

Figure 7:
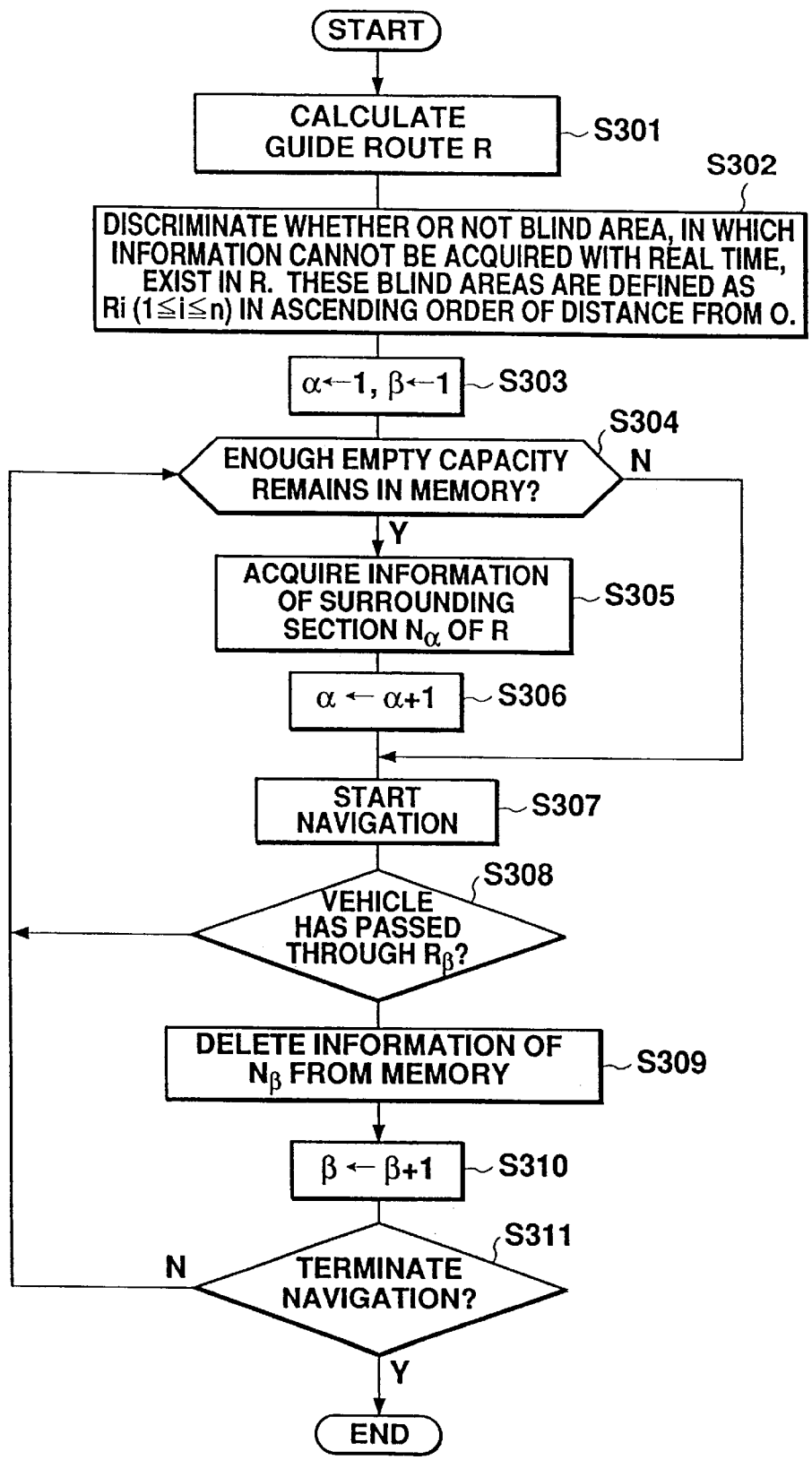
FIG. 7 is a flowchart showing sequential steps of operation of an information acquisition system according to a second embodiment of the invention.

FIG. 7 is a flowchart showing sequential steps of operation of the control unit 16. In the first embodiment, a guide route (a recommended route) is set. In the second embodiment, however, a guide route to a destination is set, namely, an area for the vehicle to run is limited.

The control unit 16 calculates a guide route R from a starting point O to a destination D using the map data stored in the data memory 18 (S301). The control unit 16 then confirms whether or not a blind area, in which map information is not acquirable from the information center with real time, exists in the guide route R (S302), comparing the guide route R with specifying data previously stored in the data memory 18. If a plurality of blind areas exist in the guide route R, the control unit 16 sets these blind areas as Ri ($1 \leq i \leq n$) in the order of increasing distance from the starting point O.

The control unit 16 then initializes each of variables α and β to 1 (S303) and confirms whether or not unused capacity sufficient to store the information remains in the map-information-non-acquirable data area 18b of the data memory 18 (s304). If sufficient unused capacity remains, the control unit 16 requests and acquires from the information center map information of a surrounding section Nα (e.g. an area covering a width of 10 km from the guide route) within a predetermined range of Rα (S305). After having acquired the information concerning Rα, the control unit 16 increments the variable α 1 by 1 (S306) and guides the vehicle using the acquired map data (S307).

With continued running of the vehicle, the control unit 16 discriminates whether or not the running vehicle has passed through Rβ (i.e. the blind area whose information was acquired in step S305) (S308). While the vehicle is still running in Rβ, the control unit 16 repeats the steps S303 to S307 to acquire the map information of the successive surrounding sections Rα one after another.

On the contrary, if the vehicle has passed through Rβ, then the map information of Nα is no longer necessary; consequently the control unit 16 deletes the map information of Nα from the map-information-non-acquirable data area 18b of the data memory 18 to increase the unused capacity of the map-information-non-acquirable data area 18b (S309). The control unit 16 then increments β by only 1 (S310) and repeats the steps S304 to S310 until the vehicle reaches the destination D to terminate the navigation (S311).

Figure 8:
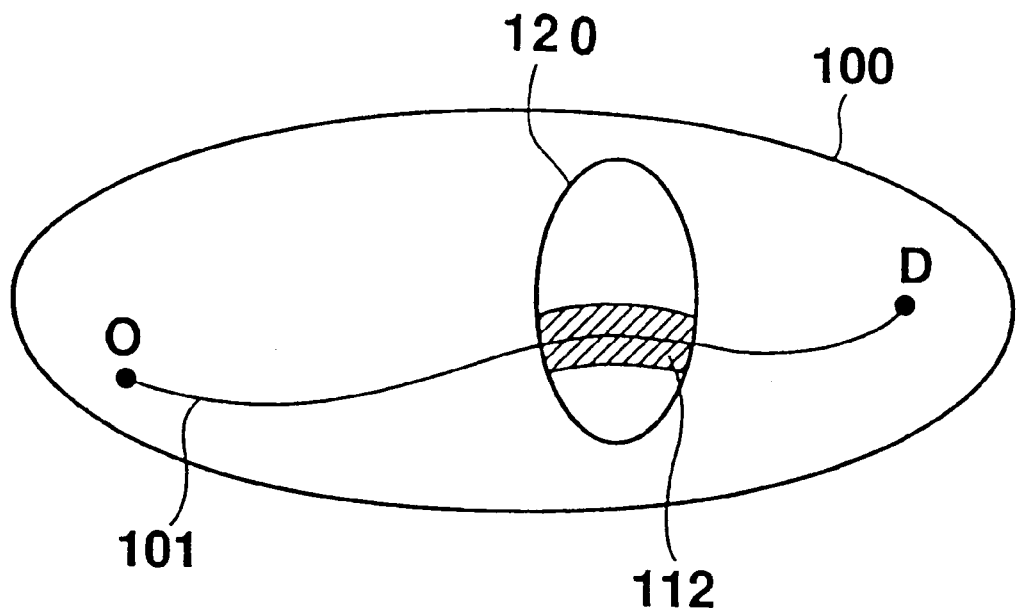
FIG. 8 is a diagram showing a first example of the sequential steps of operation of the system of the second embodiment.
Figure 9:
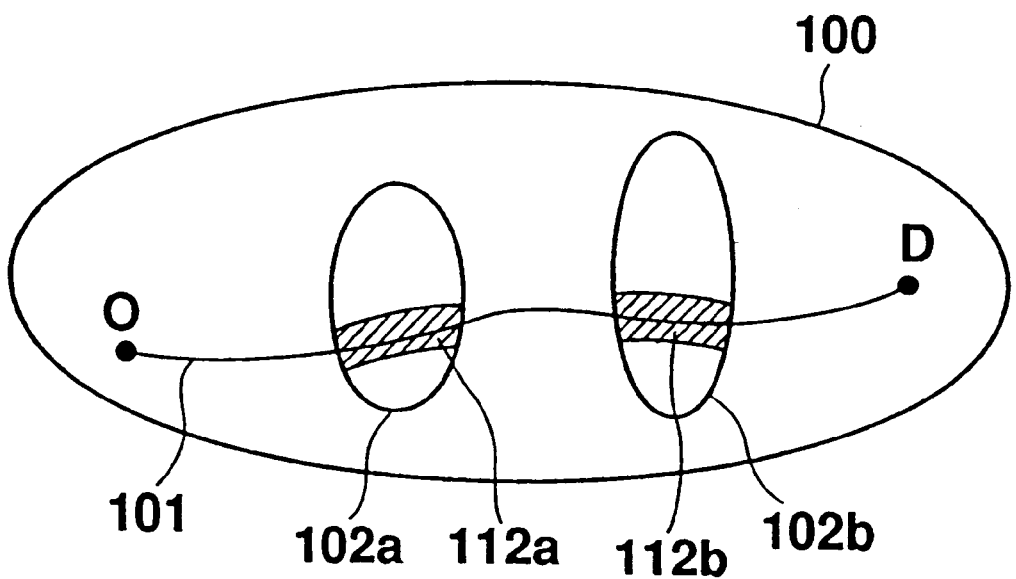
FIG. 9 is a diagram showing a second example of the sequential steps of operation of the system of the second embodiment.

The foregoing procedure is schematically shown by FIGS. 8 and 9. FIG. 8 illustrates one case in which only a single blind area exists, and FIG. 9 illustrates another case in which a plurality of (two) blind areas exist. In FIG. 8, if a blind area 120 in which map information cannot be acquired from the information center in real time exists on a guide route 101 from the starting point O to the destination D, the control unit 16 transmits a request to the information center to previously acquire the information of a peripheral section 112 of the guide route 101 within the blind area 102. The control unit 16 then stores the acquired information in the map-information-non-acquirable data area 18b of the data memory 18. Therefore, even when the vehicle is running in the blind area 102, the vehicle can be navigated using the previously acquired map information.

In FIG. 9, if first and second blind areas 102a, 102b, in which map information cannot be acquired from the information center in real time, exist in a guide route 101 from the starting point O to the destination D, the control unit 16 first confirms that the unused capacity of the map-information-non-acquirable data area 18b of the data memory 18 is sufficient to store map information of a peripheral section 112a of the guide route 101 within the first blind area 102a, then acquires and stores the formation in the map-information-non-acquirable data area 18b. The control unit 16 then reconfirms whether or not the unused capacity of the map-information-non-acquirable data area 18b is still sufficient, and acquires the map information of a peripheral section 112b of the guide route 101 within the second blind area 102b if the remaining unused capacity is sufficient. If the remaining unused capacity is not sufficient, the control unit 16 waits until after the vehicle has passed through the first blind area 102a, then deletes the map information of the first blind area 102*a* from the map-information-nonacquirable data area 18*b* after the vehicle has passed through the first blind area 102*a,* whereupon the control unit 16 acquires the information concerning the second blind area 102*b.*

Therefore, even when a blind area, in which map information such as map data and facility data cannot be acquired from the information center, exists in the guide route, the vehicle can keep running smoothly using the previously acquired map information of the blind area.

In this embodiment, like the first embodiment, the predetermined distance may be set as a plurality of distance steps so that the farther the distance from the guide route, the simpler the level of map information that may be acquired.

Further, in FIG. 9, if the capacity of the data memory is not sufficient in the presence of the blind areas 102*a,* 102*b* in the guide route, the control unit 16 can acquire the map information including small streets with respect to the first blind area 102*a* and the map information of simple level concerning only main roads.

In the foregoing embodiments, the system acquires every map data from the information center. The present invention may be applied to a system in which wide-area map data are previously stored in the data memory 18 and only detailed map data are acquired from the information center as required.

According to the information acquisition system of the present invention, since the system previously acquires the map information concerning a blind area from the information center when the vehicle approaches the blind area, the vehicle can keep running smoothly in the blind area.

What is claimed is:

1. A vehicle information acquisition system for acquiring map information from an external source outside the vehicle, comprising:
   (a) storage means for storing specifying data of a blind area in which the map information is not acquirable by radio communication; and
   (b) control means for acquiring, based on said specifying data, the map information of said blind area by requesting the external source for the map information when the vehicle approaches said blind area.

2. An information acquisition system according to claim 1, further comprising means for detecting a current position of the vehicle, wherein said control means acquires the map information within a predetermined range from said current position detected by said detecting means.

3. An information acquisition system according to claim 2, wherein said predetermined range is composed of a plurality of distance steps for each of which said control means acquires a different level of map information.

4. An information acquisition system according to claim 2, wherein said predetermined range is composed of a plurality of distance steps for each of which said control means acquires a different level of map information to store the acquired map information in said storage means commensurate with an unused capacity of said storage means.

5. An information acquisition system according to claim 4, wherein said control means deletes the map information of said blind area after the vehicle has passed through said blind area.

6. An information acquisition system according to claim 1, further comprising means for detecting a current position of the vehicle, and means for searching an optimum route from the current position of the vehicle to a destination, wherein if said blind area exists on said optimum route, said control means acquires the map information of said blind area.

7. An information acquisition system according to claim 6, wherein if there exist in said optimum route a plurality of blind areas in which the map information is not acquirable, said control means acquires the map information of different levels each corresponding to a distance between a respective one of said blind areas and the current position of the vehicle.

8. An information acquisition system according to claim 6, wherein if there exist in said optimum route a plurality of blind areas in which the map information is not acquirable, said control means acquires different levels of the map information, one for each of said blind areas, to store the acquired map information in said storage means commensurate with an unused capacity of said storage means.

9. An information acquisition system according to claim 8, wherein after the vehicle has passed through each of said blind areas, said control means deletes the map information of each of said blind areas.

10. A vehicle information acquisition system for acquiring map information from an external information center outside the vehicle, comprising:
   (a) a memory for storing specifying data of a blind area in which the map information is not acquirable by radio communication;
   (b) a processor for acquiring, based on said specifying data, the map information of said blind area by requesting the external information center for the map information when the vehicle approaches said blind area; and
   (c) a radio communication device for requesting, based on a signal from said processor, the external information center for the map information and for receiving the map information transmitted from the information center.

11. An information acquisition system according to claim 10, wherein said memory has a first area for storing said specifying data, a second area for storing data of a map-information-acquirable area in which the map information is acquirable from the external information center, and a third area for storing the acquired map information.

12. An information acquisition system according to claim 10, further comprising a detector for detecting a current position of the vehicle, wherein said processor acquires the map information of different levels commensurate with a distance from the current position of the vehicle to said blind area.

13. An information acquisition system according to claim 12, wherein if said blind area exists on an optimum route from the current position of the vehicle to a destination, said processor acquires the map information of different levels commensurate with the distance from the current position of the vehicle to said blind area.

* * * * *